INVENTOR.
ROBERT W. STUART, JR
BY Kenway, Jenney & Hildreth
ATTORNEYS

Nov. 5, 1963 R. W. STUART, JR 3,109,928
INDICATING COUNTER
Filed July 28, 1961 3 Sheets-Sheet 2

INVENTOR.
ROBERT W. STUART, JR
BY
ATTORNEYS

Nov. 5, 1963     R. W. STUART, JR     3,109,928
INDICATING COUNTER
Filed July 28, 1961     3 Sheets—Sheet 3

FIG. 4

INVENTOR.
ROBERT W. STUART, JR
BY Kenway, Jenney & Hildreth

ATTORNEYS

United States Patent Office 3,109,928
Patented Nov. 5, 1963

3,109,928
INDICATING COUNTER
Robert W. Stuart, Jr., Concord, Mass., assignor to Computer Control Company, Inc., Framingham, Mass., a corporation of Delaware
Filed July 28, 1961, Ser. No. 127,690
5 Claims. (Cl. 235—92)

My invention relates to digital indicators, and particularly to an improved code converting digital indicator having low voltage swing requirements for use with limited output devices such as transistorized binary counters and the like.

A necessary component of many electronic systems is a readout device that will display information visually, in digital form, in response to digital information generated at a random, and at times extremely rapid, rate. Usually, the codes best adapted for use in a particular electronic system are unsuitable for visual interpretation. Therefore, it is often desired that an indicator perform a code conversion prior to indication. For example, it may be desired to indicate in decimal form the number of pulses fed to a binary counter as determined by the binary output state of the counter. It is frequently undesirable to use electromechanical indicators for this purpose, since the time delays inherent in such indicators place a limitation on the speed of response of the system in which they are used, which may defeat the purpose of the system. To avoid such delays, incandescent lamps or neon glow-tubes are commonly used as indicators in high speed systems.

Since the neon glow-tube is a bistable device, it can be used to perform logic functions, and is therefore preferable to the incandescent lamp for use in indicators requiring logical operations, such as code conversion, between the input and the output display. The relatively high voltage swing required to ionize and de-ionize commercial forms of neon glow-tubes has, in the past, limited their practical application to circuits driven by vacuum tubes. In accordance with my invention, this difficulty is avoided by the use of a novel decoding matrix employing neon glow-tubes and resistors so arranged that a voltage swing smaller than the voltage normally required to ionize one of the glow-tubes is sufficient to change the state of the matrix.

An additional advantage of the digital indicator of my invention is that it is adapted for electronic blanking during counting, when, particularly on large panels employing many banks of indicators, the intermittent flashing of indicators can be extremely irritating and annoying to an operator or observer stationed at the panel.

Briefly, my invention comprises a digital indicator having a first set of neon glow-tubes arranged in an ordered array, each of which is assigned a decimal digit value, so that when a particular tube of the set is ionized and glowing, while the rest of the tubes are de-ionized, the digit associated with the glowing tube is indicated. Associated with each of the indicating tubes is one or more inhibiting glow-tubes having one terminal connected to a terminal of the indicating tube. The common terminals of the indicating and inhibiting tubes are connected to a source of voltage through a voltage dropping resistor. The opposite terminals of the indicating lamps are connected to the binary units output terminals of a binary counter, in a manner to be described in detail below, through one or the other of a first pair of resistors of a relatively high resistance value, and the opposite terminals of the inhibiting tubes are connected to selected terminals of the counter through resistors of relatively lower value. By this arrangement, conduction of an inhibitor tube so lowers the voltage at the common terminal of an associated indicator tube that it cannot be ionized, whereas conduction of an indicator tube does not lower the voltage at the common terminal of an associated inhibitor tube enough to prevent its ionization. Thus, the inhibitor tubes are ionized preferentially, and control the ionization of the indicator tubes. An important advantage of this arrangement is that the voltage swing required to be applied to a given tube terminal need only be a relatively low value which is readily attained at the output terminals of a conventional transistorized counter.

My invention will best be understood by reference to the accompanying drawings, in which, FIG. 1 is a schematic wiring diagram of an indicating system in accordance with one embodiment of my invention;

FIG. 4 is a chart showing the condition of the various indicating and inhibiting tubes employed in the system of FIG. 1 as a function of the conditions at the input terminals of the various units in FIG. 1 in the various stages of the counting cycle.

Figure 1:
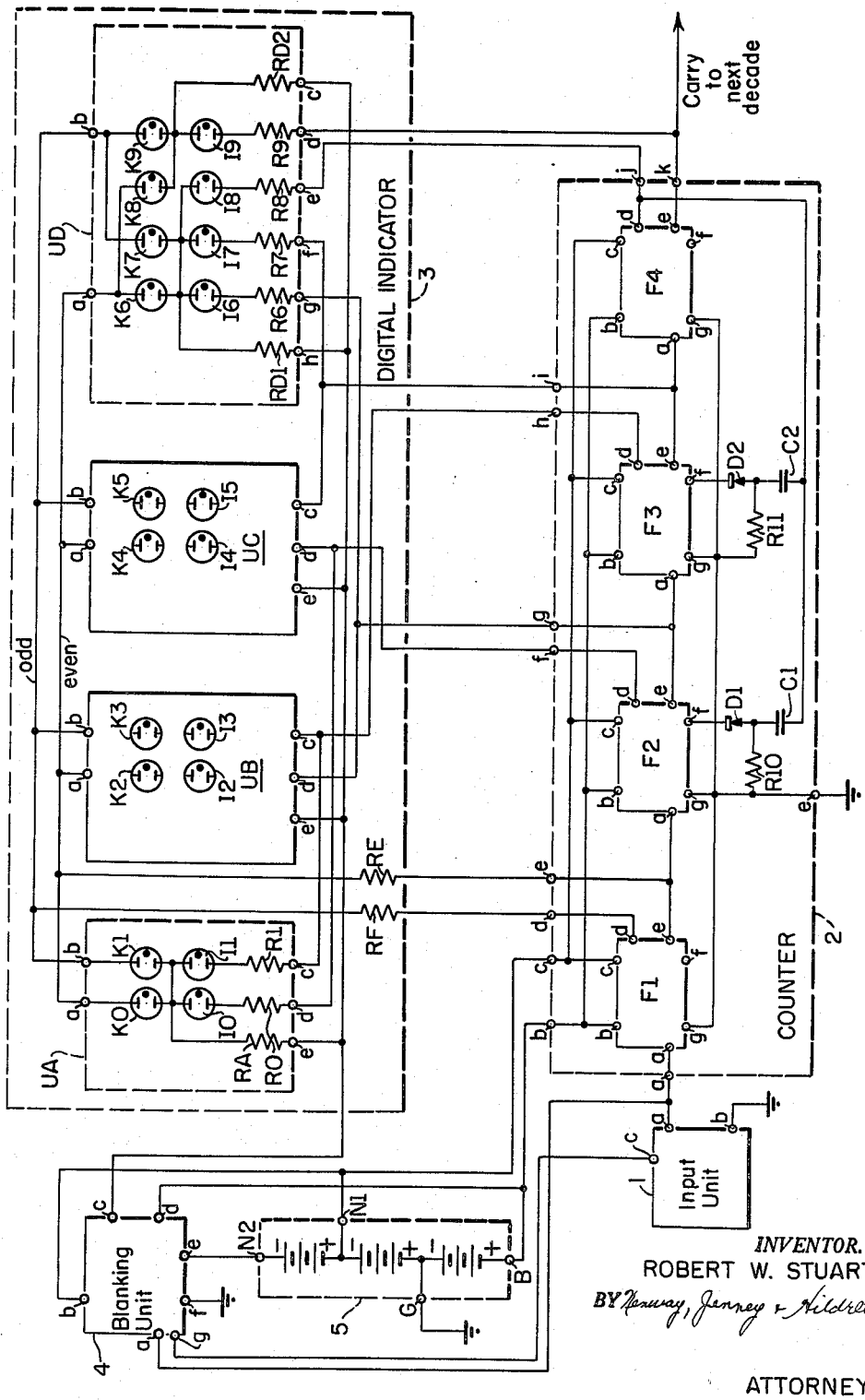

Various conventions have been employed in the drawings for the purpose of simplifying the description, and facilitating the understanding, of my invention, which will not necessarily have any significance in a physical embodiment thereof. Specifically, where convenient to do so, I have arbitrarily shown dotted lines surrounding a portion of the apparatus that is best understood as a unit, and where such units are repeated in the system I have merely shown them in block form without repeating their internal wiring. For reference purposes, I have arbitrarily shown terminals defining inputs and outputs of these blocks, and have assigned reference characters to these terminals. Of course, it will be readily apparent to those skilled in the art that these conventions are employed merely for purposes of illustration, and that in practice the components of the circuits shown will be arranged as dictated by conventional wiring methods.

Referring now to FIG. 1, I have shown an input unit 1 which can be any desired computer or control unit, or a component thereof, which includes means for supplying a series of electrical pulses that it is desired to count between an output terminal $a$ and a grounded terminal $b$. This unit may include a gate or other conventional switching device for switching the pulse supply means between active and inactive states, and means for producing a D.C. voltage between an auxiliary output terminal $c$ and ground terminal $b$, when the unit is in its active state and emitting pulses, for purposes to be described. The pulses emitted by circuit 1 may be of any desired repetition rate, and the rate may vary randomly. In the illustrated embodiment, it is assumed that the pulses are positive-going, although negative-going pulses could be employed if so desired with obvious changes in the wiring to be described.

Pulses from unit 1 are supplied to input terminal $a$ of a counter 2, which, as shown, may be a conventional binary counter employing four bistable units F1, F2, F3 and F4, arranged in cascade and having feedback connections to provide 10 discrete output states of the counter output terminal $d$, $e$, $f$, $g$, $h$, $i$, $j$ and $k$ in response to succeeding input pulses, such that the counter counts from 0 to 9, and then repeats.

The output terminals of counter 2 are connected to a digital indicator 3, to be described in detail below. Generally speaking, indicator 3 comprises 10 indicating neon glow-tubes K0 through K9, and 10 inhibiting neon glow-tubes I0 through I9. For purposes of illustration, the circuits interconnecting these tubes have been broken into groups to be considered as units, which units are designated as UA, UB, UC and UD. In a manner to be described in detail below, these units are energized from the output terminals of counter 2 in such a manner that one and only one of the indicating tubes K0 through K9 is energized in each state of the counter. In practice, indicator tubes K0 through K9 would be mounted in a visible, ordered array, while tubes I0 through I9 would be concealed from view by a panel, cover or the like.

Also connected to indicator 3 is a blanking unit 4, which functions to extinguish all of the tubes in indicator 3, either automatically in response to a condition of the input unit, or as desired.

The power supply for the system of FIG. 1 may be of any desired conventional design, but as here schematically shown comprises a unit 5 incorporating batteries connected to supply a reference potential at a ground terminal G and three additional potentials B, N1 and N2 at the correspondingly designated terminals. For example, in one practical embodiment of my invention, the values of these potentials were 6 volts for terminal B, −150 volts for terminal N1, and −300 volts for terminal N2.

Before describing the system of FIG. 1 in further detail, the detailed structure and operation of certain of the components of the system will be described. First, referring now to FIG. 2, a typical bistable unit F1 is shown, which may be employed for use as any of bistable units F1 through F4 in FIG. 1. It should be noted in this regard that the arbitrary external terminals shown on the circuit of FIG. 2 correspond to similarly designated terminals of the bistable units shown in FIG. 1.

Figure 2:
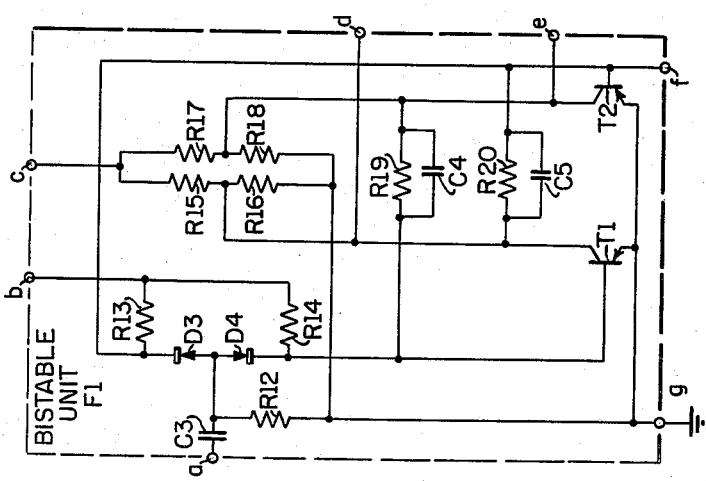
FIG. 2 is a schematic wiring diagram showing the details of a bistable circuit which may be employed as a component of the system shown in FIG. 1.

The circuit of FIG. 2 is essentially conventional in design and operation, and will be generally familiar to those skilled in the art. Therefore, it will be described only briefly. Basically, the circuit comprises two transistors T1 and T2, which are connected in a bistable circuit such that only one of the transistors is conducting at a time, and such that the circuit is stable with either transistor conducting. As shown, the transistors are of the p-n-p type, although n-p-n transistors are equally suitable with appropriate changes in the bias potentials. The emitters of transistors T1 and T2 are connected together and grounded at ground terminal g. The collectors are connected to symmetrical voltage dividers, comprising resistors R15 and R16 for transistor T1, and resistors R17 and R18 for transistor T2, which are connected between supply terminal c and ground terminal g as shown. The bias circuit is completed by connections from the bases of transistors T1 and T2, through resistors R14 and R13, respectively, to supply terminal b of the bistable unit F1. Referring to FIG. 1, it is seen that supply terminal c is connected to terminal N1 of the power supply, which has a suitable negative potential, of, for example, −150 volts, and terminal b is connected to terminal B of the power supply, at a positive potential of, for example, 6 volts. Thus, assuming that transistor T2 is conducting, its collector and output terminal e of unit F1 will be at ground potential, and the base of transistor T1 will be held at a value sufficient to cut it off through the coupling network comprising resistor R19 and capacitor C4 connected between the collector of transistor T2 and the base of transistor T1. With transistor T1 cut off, the coupling network comprising resistor R20 and capacitor C5, connecting its collector and the base of transistor T2 will assist in forward biasing the emitter of transistor T2 with respect to its base. In this state, the potential of output terminal d will be approximately N1/2 in the specific embodiment here described.

The state of the bistable unit just described may be considered the zero state as it is used in the system of FIG. 1. The unit may be returned to this state by conventional reset means, not shown, which may, for example, comprise means for opening the circuit between the emitter of transistor T1 and ground momentarily to force transistor T1 to cut off. Since the bistable unit does not form a part of my invention, however, such details have not been shown.

The state of bistable unit F1 may be changed by a positive-going pulse applied to input terminal a. This pulse is applied through capacitor C3 and across resistor R12 to the junction of two diodes D3 and D4 which have their opposite terminals connected to the bases of transistors T2 and T1, respectively, as shown. Assuming that transistor T2 is conducting and transistor T1 is non-conducting, a positive pulse applied to the bases of the transistors will not affect transistor T1, but will cut off transistor T2. The consequent drop in its collector potential will bias transistor T1 to conduction. The succeeding pulses applied to input terminal a will cause the unit to revert to its original state, in a manner that will be well understood by those skilled in the art.

An additional terminal f is shown on unit F1, which is connected to the base of transistor T2. This connection is for the purpose of applying a feedback pulse, in a manner to be described, which is positive-going, and which will cause transistor T2 to be driven to its non-conducting state. This section is necessary in the operation of the counter, as will appear.

Referring now to FIG. 1, it will be seen that the output terminal e of each of bistable units F1, F2 and F3 is connected to input terminal a of each of the succeeding bistable units. Thus, ignoring the effect of the feedback network, each time one of the bistable units F1, F2 and F3 is driven from its normal state, with a negative voltage appearing on its output terminal d and ground voltage appearing on its output terminal e, to the opposite state, a negative going pulse will be applied to the input terminal a of the succeeding bistable unit, which will not affect its operation. However, when one of these bistable units is driven back to its normal state, the terminal e going from a negative potential to ground potential, a positive-going pulse will be produced that will drive the following bistable unit to its opposite state. A binary sequence would thus be enforced in which unit F1 would change state on every pulse, unit F2 on every other pulse, unit F3 on every fourth pulse, and unit F4 on every eighth pulse. With the feedback connections, however, a different sequence is enforced. From output terminal d of unit F4, a feedback connection is made which is tied through capacitors C1 and C2, respectively, and diodes D1 and D2, respectively, to the feedback terminals f of bistable units F2 and F3. Resistors R10 and R11, respectively, are connected between the junctions of the capacitors and diodes and ground, as shown. With this arrangement, the count proceeds normally up through 7, as described above, but at the count of 8 bistable unit F4 is reversed for the first time in the cycle, and a positive-going pulse is applied from its output terminal d to input terminal f of units F2 and F3.

Referring now to FIG. 4, in conjunction with FIG. 1, the effect of this feedback will be considered. First, in reading FIG. 4 it should be understood that the characters 0 and 1 associated with the respective counter terminals at a particular count of the cycle are to be understood to mean that a voltage of ground potential exists on the terminal where the symbol 0 appears, and the potential of $N1/2$ appears on the terminal where the sign 1 appears. Thus, on count 0 each of the terminals e, g, i and k of the counter, which are connected to terminals e of bistable units F1 through F4, are at 0 or ground potential, and each of terminals d, f, h and j of the counter, corresponding to terminals d of the bistable units, are at $N1/2$ volts as indicated by the symbol 1 in FIG. 4.

At count 1, the first bistable unit F1 is reversed, and the other units remain the same. At count 2, unit F1 is reversed again and unit F2 receives a positive pulse that causes it to reverse, with the remaining units unchanged. At count 3, only unit 1 is reversed. At count 4, unit 1 is reversed, causing unit 2 to reverse again, and this time a positive pulse is applied to unit F3 to reverse it. At count 5, again only unit 1 is reversed. At count 6, units 1 and 2 are reversed. At count 7, only unit 1 is reversed.

At the eighth count, unit F1 is reversed and applies a positive-going pulse to unit F2. Next, unit F2 will go over, causing unit F3 to go over, which in turn causes unit F4 to go over. When unit F4 does so, a positive-going pulse is applied to the feedback terminals of units F2 and F3, which resets them to their original state. Thus, the net result of the eighth count is to reverse only units F1 and F4.

At the ninth count, unit F1 is reversed, and since a negative-going pulse is produced at its output terminal $e$, the remaining units are unchanged. The next, or tenth, pulse, will cause units F1, F2, F3 and F4 all to reverse. The feedback connections are ineffective at this time, since in this transistion of F4 the feedback pulse is negative-going and is blocked by diodes D1 and D2. Thus, the counter is returned to the 0 count state on the tenth count, and thereby exhibits 10 and only 10 discrete states which are cyclically encountered in response to succeeding input pulses applied to terminal $a$ of the counter.

It will be apparent to those skilled in the art that either the sequence of states of terminals $d$, $f$, $h$ and $j$ or $e$, $g$, $i$ and $k$ of the counter, determine the count in terms of a particular binary code. With suitable revisions in the feedback connections, it is apparent that other codes could be formed if so desired.

Before describing the digital indicator 3 in detail, the details of blanking unit 4 will first be described.

Figure 3:
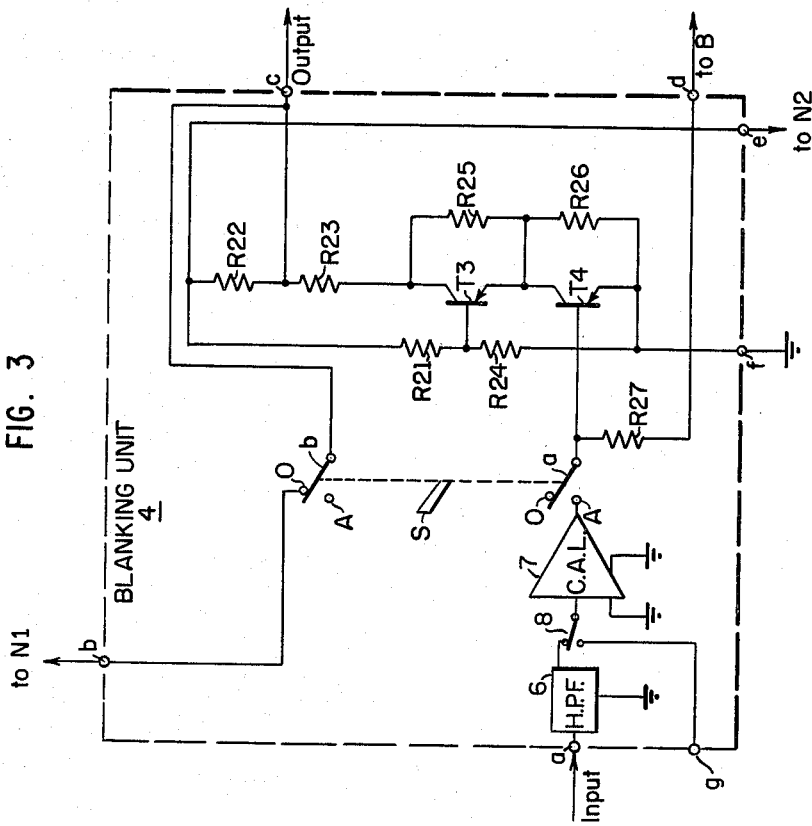
FIG. 3 is a schematic wiring diagram of a blanking circuit which may be employed in the system of FIG. 1.

Referring now to FIG. 3, in combination with FIG. 1, the blanking unit comprises a device for supplying either a constant output potential at its output terminal $c$ of the potential $N1$, or a potential of lower magnitude, in a manner which can be controlled either manually or automatically. As will appear, terminal $c$ of unit 4 is connected to supply the indicator and inhibitor tubes of indicator 3, and the lower negative potential at times supplied by unit 4 is insufficient to ionize any of the tubes. Accordingly, the overall function of unit 4 is to extinguish all the tubes of indicator 3 at certain times.

Since a possible application of such a blanking unit is to prevent the tubes from flashing when the count is too rapid to be visually interpreted, I have shown a specific embodiment in which the blanking may be carried out automatically when the frequency, or rate of repetition, of the incoming pulses from source 1 is above a predetermined level. For this purpose, as shown in FIG. 1, output terminal $a$ of pulse source 1 is connected to input terminal $a$ of blanking unit 4. Comparing FIGS. 1 and 3, it will be seen that terminal $b$ of unit 4 is connected to terminal $N1$ of power supply 5, terminal $c$ of unit 4 is connected to indicator 3 in a manner to be described, terminal $d$ of unit 4 is connected to terminal B of power supply 5, terminal $e$ of unit 4 is connected to terminal $N2$ of power supply 5, and termial $f$ of unit 4 is connected to ground.

Referring now to FIG. 3, input terminal $a$ is connected to the input of a high-pass filter 6. Filter 6 may be designed in a conventional manner to cut off below any desired frequency above which it is undesired to operate the indicator, and above this frequency to apply an output voltage to a current amplifier and limiter 7 over a double-throw switch 8 in a first position as shown. Amplifier 7 may be of any conventional design, it merely being required that it supply a constant current output in response to any appreciable input voltage from filter 6. In one specific embodiment of my invention, the current supplied was 1.7 milliamperes for blanking, and 0 milliamperes when the blanking circuit was inactive.

The filter 6 and amplifier 7 combine to produce a blanking signal, which may be fed to the blanking circuit proper in any suitable manner, and for example, as here shown, through a manual switch S which has two armatures $a$ and $b$ operable between an "automatic" position A and an "off" position O as shown. In the A position, the output of amplifier 7, or other suitable blanking signal source, is connected to the input of the blanking circuit proper, to be described. In the O position of switch S, terminal $b$ of blanking unit 4 is connected to output terminal $c$, thereby supplying potential $N1$ to terminal $c$.

In many systems, it will be desirable to blank the indicator when the pulse source 1 is active and producing pulses at any frequency. For this purpose, comparing FIGS. 1 and 3, auxiliary terminal $c$ of source 1, which is energized when the source is active, is connected directly to the input of amplifier 7 over terminal $g$ of unit 4 and switch 8 in its other position.

The blanking circuit comprises a potential divider which may be modified by the condition of two transistors T3 and T4. A first potential is established at the junction of two resistors R21 and R24, which have their extremities connected between terminal $e$ and ground terminal $f$. It will be recalled that terminal $e$ is at a potential of $N2$ volts, which could, for example, be −300 volts. The junction of resistors R21 and R24 is connected to the base of transistor T3. A second portion of the potential divider comprises resistors R22, R23, R25 and R26 connected between the terminal $e$ and ground terminal $f$. As shown, output terminal $c$ is connected to the junction of resistors R22 and R23. The collector of transistor T3 is connected to the junction of resistors R23 and R25, and its emitter is connected to the collector of transistor T4 and to the junction of resistors R25 and R26. The emitter of transistor T4 is connected to ground terminal $f$. The base of transistor T4 is connected through a resistor R27 to supply terminal $d$, which is at potential B, which may, for example, be +6 volts.

In operation, with switch S in its A position and no current flowing in the output circuit of amplifier 7, both of transistors T3 and T4 are cut off and output terminal $c$ is at a relatively high negative potential. However, when amplifier 7 is energized and current flows through its output circuit, it being connected such that the flow of current is away from terminal $d$, the base potential of transistor T4 is lowered below ground potential and transistor T4 conducts essentially to saturation. At the same time, the base of transistor T3 is maintained at a negative potential while its emitter is essentially raised to ground potential. Accordingly, transistor T3 also conducts essentially its saturation value of current, and the junction of resistors R23 and R25 is brought essentially to ground potential. Therefore, the potential at output terminal $c$ is raised to a relatively small negative voltage which is insufficient to ionize any of the indicator tubes.

Referring again to FIG. 1, the detailed structure and operation of digital indicator 3 will next be described. As shown, indicator 3 may be considered to be functionally divided into three identical units UA, UB and UC, and a fourth unit UD.

Since units UA, UB and UC are identical, only unit UA will be described. It comprises two indicator tubes K0 and K1, two inhibitor tubes I0 and I1, and three resistors R0, R1 and RA. The indicator tubes are connected together at a common terminal. Resistor RA is connected between this common terminal and voltage supply terminal $e$, which is connected in turn to output terminal $c$ of blanking unit 4. The other terminals of indicating tubes K0 and K1 are connected to input terminals $a$ and $b$, respectively, of unit UA, which in turn are connected through resistors RE and RF, respectively, to output terminals $e$ and $d$, respectively, of counter 2. The other terminals of inhibitor tubes I0 and I1 are connected through resistors R0 and R1 to terminals $d$ and $c$, respectively, of unit UA. Resistors RA, RE and RF may be equal to each other and of a relatively high value. Resistors R0 and R1 may be equal to each other and of a value considerably smaller than resistors RA, RE and RF, for example, approximately one-third of the size of these resistors.

It is believed that the operation of the indicator as a whole will best be understood if the operation of unit UA with the associated resistors RE and RF is first considered independent of the other apparatus. The external conditions imposed are that terminal $e$ of unit UA is energized with a potential of N1 volts. Terminals $d$ and $e$ of counter 2, connected to resistors RF and RE, respectively, are energized either with ground potential or with a voltage of approximately ½ N1 volts, such that one or the other but not both of these terminals is at ground potential. In the operation of the indicator, as will appear, where more than one unit such as UA is employed the $a$ terminals of all of the units are connected together, as are the $b$ terminals. One of the indicator tubes in one and only one of the units so connected will always be ionized when the appropriate counter terminal $d$ or $e$ is grounded. Also, none of the indicator tubes connected to the counter terminal $d$ or $e$ which is energized with ½ N1 volts will be ionized. Conduction through an ionized indicator tube will drop the potential at its associated terminal $a$ or $b$ to a value lower than ground, where N1 is negative; for example, the potential may drop to −45 volts. Thus, terminals $a$ and $b$ are energized either with ½ N1 volts or with a voltage below ground equal to the drop across resistor RF or RE caused by the current flow through one ionized indicator tube. Terminals $c$ and $d$ may each be at either ground potential or at $N1/2$ volts, independent of one another. With these conditions in mind, the various conditions shown in Table I below may occur. In Table I, for later reference, all of the input states supplied by counter 2 are included. Since there are ten states of the counter and only eight discrete inputs to unit UA under the conditions set forth above, there are two states repeated in the table. Thus, unit UA is in the same state at counts 6 and 8, and again at counts 7 and 9. As in the Table of FIG. 4, the 0's and 1's beneath the various terminals refer to ground and $N1/2$ potentials, respectively, except that for terminals $a$ and $b$, the 0's represent a negative voltage equal to the drop across RE or RF caused by the current through one indicator tube. In the columns under UA output, the states of the tubes in the unit are represented by 0 for an extinguished tube, which is not ionized, and 1 for an ionized tube which is conducting and glowing.

Table I

| Count | UA Terminals | | | | UA Output | | | |
|---|---|---|---|---|---|---|---|---|
| | a | b | c | d | K0 | K1 | I0 | I1 |
| 0 | 0 | 1 | 1 | 1 | 1 | 0 | 0 | 0 |
| 1 | 1 | 0 | 1 | 1 | 0 | 1 | 0 | 0 |
| 2 | 0 | 1 | 1 | 0 | 0 | 0 | 1 | 0 |
| 3 | 1 | 0 | 1 | 0 | 0 | 0 | 1 | 0 |
| 4 | 0 | 1 | 0 | 1 | 0 | 0 | 0 | 1 |
| 5 | 1 | 0 | 0 | 1 | 0 | 0 | 0 | 1 |
| 6 | 0 | 1 | 0 | 0 | 0 | 0 | 1 | 1 |
| 7 | 1 | 0 | 0 | 0 | 0 | 0 | 1 | 1 |
| 8 | 0 | 1 | 0 | 0 | 0 | 0 | 1 | 1 |
| 9 | 1 | 0 | 0 | 0 | 0 | 0 | 1 | 1 |

Referring to FIG. 1 in conjunction with Table I above, it will be seen that only one of indicator tubes K0 and K1 can be energized at a time because only one of terminals $d$ and $e$ of counter 2 can be at ground potential at a time. When either of these terminals is at ground potential, if the common terminal of the indicator tubes is at a potential of N1 volts, then the corresponding tube will be ionized. When an indicator tube is ionized, current flow through resistor RA raises the common potential toward ground. As to the other indicator tube, with the corresponding counter terminal at a potential of $N1/2$ and the common terminal at a potential of less than N1, there is insufficient voltage across it to cause ionization. Thus, a voltage swing of only a little more than one-half of that which is required to ionize the tube need be applied to the input terminals.

Inhibitor tubes I0 and I1 may be ionized regardless of the state of indicator terminals $a$ and $b$, but neither of the indicator tubes can be ionized if either of the inhibitor terminals $c$ and $d$ is grounded. The reason for this is that due to the smaller value of resistors R0 and R1, conduction of tube I0 or I1 draws enough current to bring the potential of the common terminal too close to ground to permit ionization of the indicator tube by applying the intermediate voltage to its other terminal $a$ or $b$. On the other hand, conduction of either of tubes K0 and K1 draws so little current through the larger resistor RE or RF that the potential at the common terminal remains high enough to permit ionization of an inhibitor tube by grounding its terminal $c$ or $d$. Thus, where there is a choice, the inhibitor tube is ionized in preference to the indicator tube and accordingly controls the indicator tube.

Each inhibitor tube can also inhibit an adjacent inhibitor tube. However, the smaller resistors in series with the inhibitor tubes take a smaller percentage of the voltage drop, and it is possible for two inhibitor tubes to be ionized in the same unit. Whether or not this will happen will depend on the exact voltages employed; in experiments with a physical embodiment of my invention, in which the power supply was energized from a 60 cycle, nominally 110 volt line, I have found that under conditions of normal or relatively high voltage, both inhibitor tubes in a unit would ionize when called on to do so, whereas under low line voltage conditions only one of the inhibitor tubes would ionize. In the latter case, when both tubes were called on to ionize simultaneously, the predominating tube would be randomly selected. In cases, such as the transition between counts 5 and 6 shown in Table I above, in which an attempt was made to ionize the second tube with the first tube conducting, the second tube would not conduct under low voltage conditions. While of theoretical interest, this phenomenon is actually irrelevant to the operation of the indicator of my invention, because as long as one inhibitor tube in the unit is ionized, it makes no difference whether a second or third tube is ionized or not.

The structure and operation of units UB and UC are identical with those of unit UA. The various states assumed by these units in response to corresponding states of counter 2 are shown in FIG. 4. In FIG. 4, it should be recalled that the 0's have a somewhat different significance as applied to terminals $a$ and $b$ of units UA, UB, UC, and UD than they do as applied to the corresponding counter terminals $d$ and $e$, because of the drop across either resistor RE or resistor RF, as explained above.

The structure and operation of unit UD, as shown in FIG. 1, is similar in principle to the other units just described, except for differences in wiring to properly follow the logic of the last four counts. As shown, indicator tubes K6 and K7 form a pair having a common terminal, to which is connected one terminal of a supply resistor RD1 and one terminal of each of three inhibitor tubes I6, I7 and I8. The other terminal of resistor RD1 is connected to supply terminal $h$, and thence to output $c$ of blanking unit 4, to be energized at the potential N1 under normal conditions, and at a much lower voltage under blanking conditions, as described above. The other terminals of inhibitor tubes I6, I7 and I8 are connected to input terminals $g$, $f$ and $e$, respectively. Resistor RD1 has the same value as resistor RA in unit UA, and resistors R6, R7 and R8 are equal in value to resistors R0 and R1 of unit UA.

Indicator tubes K8 and K9 have a common terminal and have their other terminals connected to input terminals $a$ and $b$, respectively, to form a second pair. A single inhibitor tube I9 has one terminal connected to the common terminal, and its other terminal connected to output terminal $d$ through a resistor R9 equal in value to resistors R6, R7 and R8. A supply resistor RD2, which may be equal in value to resistor RD1, is connected between the common terminal of indicator tubes K8 and K9 and output terminal c of unit UD, which in turn is connected to output terminal c of blanking unit 4.

In operation, as stated above, unit UD functions in a manner similar to unit UA described above. Each of the indicator tubes may be ionized by applying ground potential to the counter terminal d or e corresponding to its input terminal if none of the inhibitor tubes connected to its other terminal is conducting. The possible combinations are shown in Table II below. The 0's and 1's in Table II refer to ground and $N1/2$ potentials as applied to the terminals of unit UD except that the 0's differ from ground potential by the amount determined by the current through an ionized indicator tube for terminals a and b. As before, the 0's and 1's applied to the tubes K6–K9 and I6–I9 indicate extinguished and ionized tubes, respectively.

*Table II*

| Count | UD Terminals | | | | | | UD Output | | | | | | | |
|---|---|---|---|---|---|---|---|---|---|---|---|---|---|---|
| | a | b | d | e | f | g | K6 | K7 | I6 | I7 | K8 | K9 | I8 | I9 |
| 0 | 0 | 1 | 0 | 1 | 0 | 0 | 0 | 0 | 1 | 1 | 0 | 0 | 0 | 1 |
| 1 | 1 | 0 | 0 | 1 | 0 | 0 | 0 | 0 | 1 | 1 | 0 | 0 | 0 | 1 |
| 2 | 0 | 1 | 0 | 1 | 0 | 1 | 0 | 0 | 0 | 1 | 0 | 0 | 0 | 1 |
| 3 | 1 | 0 | 0 | 1 | 0 | 1 | 0 | 0 | 0 | 1 | 0 | 0 | 0 | 1 |
| 4 | 0 | 1 | 0 | 1 | 1 | 0 | 0 | 0 | 1 | 0 | 0 | 0 | 0 | 1 |
| 5 | 1 | 0 | 0 | 1 | 1 | 0 | 0 | 0 | 1 | 0 | 0 | 0 | 0 | 1 |
| 6 | 0 | 1 | 0 | 1 | 1 | 1 | 1 | 0 | 0 | 0 | 0 | 0 | 0 | 1 |
| 7 | 1 | 0 | 0 | 1 | 1 | 1 | 0 | 1 | 0 | 0 | 0 | 0 | 0 | 1 |
| 8 | 0 | 1 | 1 | 0 | 1 | 1 | 0 | 0 | 0 | 0 | 1 | 0 | 1 | 0 |
| 9 | 1 | 0 | 1 | 0 | 1 | 1 | 0 | 0 | 0 | 0 | 0 | 1 | 1 | 0 |

In Table II, it will be noted that at counts 0 and 1, inhibitor tubes I6 and I7 are both required to be ionized. As explained above, depending on the values of the components and of the supply voltage, either or both of these tubes may be ionized, but as long as one tube is ionized the operation of the indicator tubes will not be affected.

The overall operation of the illustrated embodiment of my invention is summarized in FIG. 4. At each count, a corresponding condition of the terminals of the various units are shown by 0's indicating ground potential and 1's indicating a potential of $N1/2$, except as applied to terminals a and b of units UA–UD as explained above. The corresponding states of the indicator and inhibitor tubes are shown in columns designated by the reference characters of the tubes. Here, a 0 indicates an extinguished tube, and a 1 a conducting tube. It will be noted that one and only one indicator tube is conducting at each count, the conducting indicator tube being indicated in FIG. 4 by a heavy line around the entry in the table so that the count progression can be visualized at a glance.

The operation of the system shown in FIG. 1 will be apparent from the above description. Briefly, as each pulse is supplied from source 1, counter 2 responds by a change of state of its output terminals d, e, f, g, h, i, j and k in the manner shown in FIG. 4. As the count progresses, the digital indicator 3 is energized to cycle its indicating tubes in the manner shown in FIG. 4. In any state of the indicator, the output terminal a or b connected to the conducting indicator tube, and to the corresponding indicator tubes in the other units, will be below ground potential as explained above, such that the voltages across the other indicator tubes are reduced to positively prevent improper operation. Should the repetition rate of the pulses become too great to visually interpret, or if it is desired to blank the unit during counting, blanking unit 4 will function to reduce the supply voltage to indicator 3 and extinguish the tubes. It should be noted in this regard that the operation of the indicator of my invention is completely independent of the counter, and blanking of the indicator does not interfere with the progress of the count. Moreover, since the indication is positively determined at each count and does not depend on the previous count for proper operation, the indicator will respond properly when reenergized at any point in the cycle.

While I have shown only a single decade in the system of FIG. 1, it will be apparent that any number of decades could be cascaded. The input to the next decade from the system of FIG. 1 would be supplied by output terminal k of counter 2, at which a positive-going pulse will appear every tenth count which would be suitable for application to the input terminal a of a succeeding counter 2.

I have illustrated my invention with emphasis on the advantages to be obtained with neon glow-tubes. However, other bistable devices exhibiting two discrete impedance states may also be employed, if so desired, without departing from the scope of my invention.

The values of the components employed in the indicator and counting system of my invention can obviously be selected from a wide range of values in accordance with conventional design practice, in a manner that will be obvious to those skilled in the art. However, as a specific example, I have found that one set of suitable values for the components are as shown in Table III below.

In Table III, values of resistors are given on ohms, and all resistors are ½ watt with tolerances of plus or minus 5 percent unless otherwise noted. The values of the capacitors are in micromicrofarads, and these should also have 5 percent tolerances.

*Table III*

| Component: | Value |
|---|---|
| RE–R9 | 82K |
| R10–R12 | 6.8K |
| R13, R14, R27 | 22K |
| R15, R17 | 56K, 1 w. |
| R16, R18–R20 | 120K |
| R21 | 240K |
| R22 | 20K, 5 w. |
| R23 | 3.3K, 1 w. |
| R24 | 62K |
| R25, R26 | 56K |
| RA–RC, RD1, RD2, RE, RF | 220K |
| C1–C3 | 120 |
| C4 | 68 |
| C5 | 180 |

In reading Table III above, it should be understood that the designation of the components of units UB and UC follow the scheme sufficiently illustrated in units UA and UD. That is, the supply resistors of the units have a suffix B for unit UB and C for unit UC, and the inhibitor tube supply resistors have suffixes corresponding to the suffix of the associated inhibitor tubes. All of the diodes shown in the circuits may be of the type 1N636, and all transistors may be of the type 2N398. All of the neon glow-tubes may be of the NE-2 type. Finally, comparing Table III with FIG. 2, in bistable unit F4 the capacitors corresponding to C4 and C5 in that unit were given values of 220 micromicrofarads and 120 micromicrofarads, respectively.

While I have described only one embodiment of my invention in detail, many changes and variations will become apparent to those skilled in the art upon reading my description, and such changes can obviously be made without departing from the scope of my invention.

Having thus described my invention, what I claim is:

1. In combination, a counter having a predetermined number of discrete successive output states, an array of bistable indicating means, each having an energized and a de-energized state, one indicating means for each discrete output state of said counter, each means having two terminals, said array comprising a first set and a second set, means controlled by said counter for applying a first potential to one terminal of each means of said first set in response to every other output state of said counter, means for applying said first potential to common terminals of each means of said second set in response to intermediate output states of said counter, impedance means for applying a second potential to the other terminals of said indicating means, and inhibiting means controlled by said counter for reducing the potential across all of said indicating means except a unique one for each output state of the counter, whereby one and only one of said indicating means is energized for each output state of the counter.

2. In combination, a source of electric pulses of varying repetition rate, an electronic counter controlled by said pulses and cycling through a set of unique outputs in response to succeeding pulses, a visual indicator controlled by said counter for displaying a unique indication for each output of said counter, means for supplying energy to said indicating means, and means responsive to the repetition rate of said pulses for reducing the supply of energy to said indicator to prevent the display of indications when said repetition rate is above a predetermined level.

3. An indicating counter, comprising, in combination; an electronic counter comprising a predetermined number of ordered bistable circuits each having a pair of output terminals energized with first and second potentials in a sequence determined by the binary state of the bistable circuit; first and second impedances each having one terminal connected to the output terminals of the first bistable circuit of said counter; a first plurality of logic circuits, each extending through said first impedance to a first common terminal and each further comprising a first neon glow-tube having terminals connected between said common terminal and a second terminal, a third impedance and a second neon glow-tube connected between said second terminal and a third terminal, and a fourth impedance connected between said second terminal and a fourth terminal maintained at a predetermined potential; a second plurality of logic circuits, each extending through said second impedance to a second common terminal and each further comprising a first neon flow-tube having terminals connected between said second common terminal and the second terminal of one of said first plurality of logic circuits, a third impedance and a second neon glow-tube connected between said second terminal and a third terminal, and a path through the fourth impedance to the fourth terminal; and connections selected in accordance with a predetermined display code between the third terminals of the logic circuits and the output terminals of each bistable circuit of the counter but the first, whereby the pattern of illumination of the first neon glow-tubes indicates the state of the counter in said predetermined display code.

4. An indicating counter, comprising, in combination; an electronic counter comprising a predetermined number of ordered bistable circuits, each circuit having a pair of output terminals energized with first and second potentials in an order determined by the binary state of the circuit; a first impedance having one terminal connected to one output terminal of the first stage of said counter; a plurality of logic circuits, each extending through said first impedance and each further comprising a first neon glow-tube having terminals connected between said first impedance and a second terminal, a second impedance and a second neon glow-tube connected between said second terminal and a third terminal, and a third impedance connected between said second terminal and a fourth terminal maintained at a predetermined potential; and connections selected in accordance with a predetermined display code between said third terminal and the output terminals of each bistable circuit of the counter but the first.

5. In an indicating counter, an electronic counter having a plurality of ordered output terminals each maintained at a first or a second potential, respectively, according as the stage is in a first or a second state, at least one logic circuit comprising first, second, third and fourth terminals, a first resistor and a first neon glow-tube connected between said first and second terminals, a second resistor and a second neon glow-tube connected between said second and third terminals, and a third resistor connected between said second and fourth terminals, means for maintaining said fourth terminal at a reference potential, a connection between one output terminal of said counter and said first terminal, and a connection between a different ordered output terminal of said counter and said third terminal, said first and second potentials being of sufficient magnitudes with respect to said reference potential to cause said first neon glow-tube to conduct if and only if said first terminal is at said first potential and said third terminal is at said second potential.

References Cited in the file of this patent

UNITED STATES PATENTS

| | | |
|---|---|---|
| 2,521,788 | Grosdorf | Sept. 20, 1950 |
| 2,532,627 | Koci | Dec. 5, 1950 |
| 2,540,442 | Grosdoff | Feb. 6, 1951 |
| 2,547,511 | Weissman | Apr. 3, 1951 |
| 2,754,502 | Dickinson | July 10, 1956 |
| 2,763,432 | York | Sept. 18, 1956 |
| 2,810,520 | Paulsen | Oct. 22, 1957 |
| 2,843,320 | Chisholm | July 15, 1958 |
| 2,873,363 | Wanlass | Feb. 10, 1959 |
| 2,894,255 | Murphy | July 7, 1959 |
| 2,922,576 | Winfield | Jan. 26, 1960 |
| 2,934,706 | Johnson et al. | Apr. 26, 1960 |
| 2,942,193 | Tyron | June 21, 1960 |
| 2,957,168 | Dempsey et al. | Oct. 18, 1960 |